July 10, 1962 K. M. POOLE ET AL 3,044,021

GYROMAGNETIC AMPLIFIER WITH PARALLEL PUMPING

Filed May 19, 1960 3 Sheets-Sheet 1

INVENTORS K. M. POOLE
P. K. TIEN
J. A. WEISS

BY Sylvan Sherman
ATTORNEY

July 10, 1962 K. M. POOLE ET AL 3,044,021

GYROMAGNETIC AMPLIFIER WITH PARALLEL PUMPING

Filed May 19, 1960 3 Sheets-Sheet 2

INVENTORS K. M. POOLE
P. K. TIEN
J. A. WEISS

BY Sylvan Sherman
ATTORNEY

GYROMAGNETIC AMPLIFIER WITH PARALLEL PUMPING

Filed May 19, 1960 3 Sheets-Sheet 3

INVENTORS K. M. POOLE
P. K. TIEN
J. A. WEISS

BY Sylvan Sherman
ATTORNEY

United States Patent Office 3,044,021

Patented July 10, 1962

3,044,021

GYROMAGNETIC AMPLIFIER WITH PARALLEL PUMPING

Kenneth M. Poole, New Providence, Ping K. Tien, Chatham Township, Morris County, and Jerald A. Weiss, Summit, N.J., assignors to Bell Telephone Laboratories, Incorporated, New York, N.Y., a corporation of New York Filed May 19, 1960, Ser. No. 31,248
6 Claims. (Cl. 330—56)

This invention relates to electromagnetic wave systems and more particularly to gyromagnetic amplifiers and oscillators.

This is a continuation-in-part of our copending application, Serial No. 821,189, filed June 18, 1959, and now abandoned.

It has long been known that if a nonlinear reactance is driven by a low frequency signal and a single higher frequency pumping source, the flow of power at the difference frequency will introduce a negative resistance into the signal circuit. This principle has been applied by H. Suhl (Serial No. 640,464, filed February 15, 1957) and M. T. Weiss (Serial No. 660,280, filed May 20, 1957, now Patent No. 2,978,649) to produce microwave oscillators and amplifiers, the nonlinear reactance being supplied by means of a body of gyromagnetic material disposed in the region of the network common to the three signals. Since this initial work, various modes of operation of gyromagnetic amplifiers have been evolved in an attempt to find a design, or class of designs, for such devices which would lead to a practical amplifier. By "practical" is meant an amplifier capable of CW operation, and which can be energized from currently available (low power) generators.

The ability of a gyromagnetic amplifier to operate CW is intimately related to the ability of the gyromagnetic specimen to dissipate heat. Obviously, unless the specimen can dissipate heat at a reasonable rate and thereby maintain itself at some reasonable temperature, its usefulness as an amplifier is severely limited. Conversely, given a maximum rate of heat dissipation, some method of operation must be devised whereby the heat generated within the specimen is maintained below this maximum.

It is therefore an object of this invention to reduce the power absorbed in gyromagnetic oscillators and amplifiers.

The second limitation upon the ability of gyromagnetic amplifiers and oscillators to operate CW relates to the magnitude of the pumping power needed to produce useful gain. In the lower microwave frequency range, available CW sources can provide ample energizing power. At the higher frequencies, however, the available power is substantially reduced.

It is therefore a further object of this invention to reduce the pumping power requirements of gyromagnetic amplifiers and oscillators.

In accordance with the invention the above-mentioned objectives are realized by the particular arrangement of pumping and biasing fields. In particular, the biasing field is applied in a direction parallel to the direction of the magnetic field lines of the pumping signal in the region of the gyromagnetic element. The amplitude of the biasing field is adjusted in accordance with the requirements of the particular style of operation selected. For example, the amplitude of the biasing field may be adjusted to produce gyromagnetic resonance at either the signal frequency, the idler frequency, or at some frequency between the signal and idler frequencies. Alternately, the biasing field may be adjusted to induce one or more of the higher order magnetostatic modes (the so-called Walker modes) in the gyromagnetic element.

This parallel pumping style of operation is contrasted with the Suhl type electromagnetic operation or the semistatic style of operation wherein the pumping field is directed perpendicular to the biasing field and wherein the amplitude of the biasing field is adjusted to produce main resonance at the pumping frequency. It is also contrasted with the modified semistatic style of operation wherein the pumping field is applied perpendicular to the direction of the biasing field and wherein the biasing field is adjusted to produce main resonance at the idler frequency.

The parallel pumping style of operation may be employed using separate idler and signal frequencies where the pump frequency equals the sum of the idler frequency and the signal frequency in the usual manner; or the degenerate style of operation may be employed wherein the signal frequency is equal to one-half the pump frequency.

These and other objects and advantages, the nature of the present invention, and its various features, will appear more fully upon consideration of the various illustrative embodiments now to be described in detail in connection with the accompanying drawings, in which.

Figure 1:
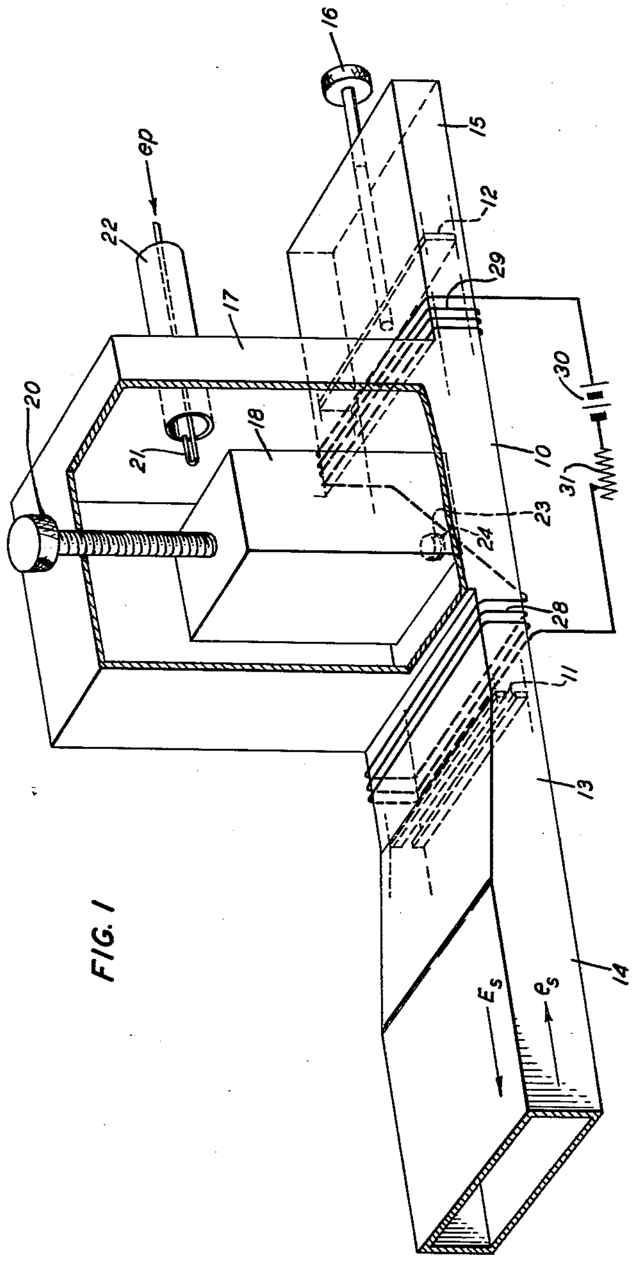
FIG. 1 is a perspective view of the first embodiment of the invention.
Figure 3:
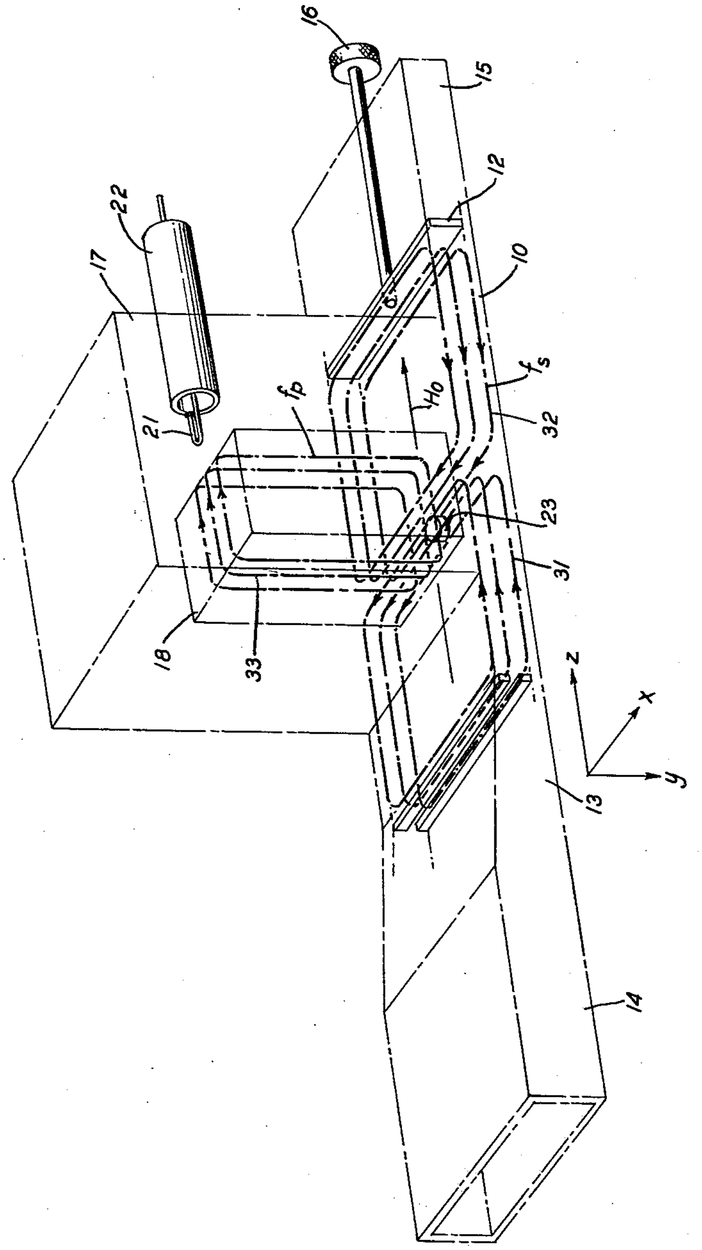
Figure 4:
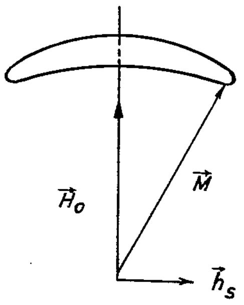
Figure 5:
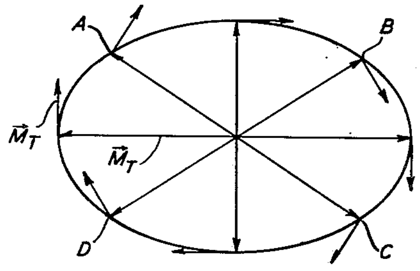
Figures 6, 7:
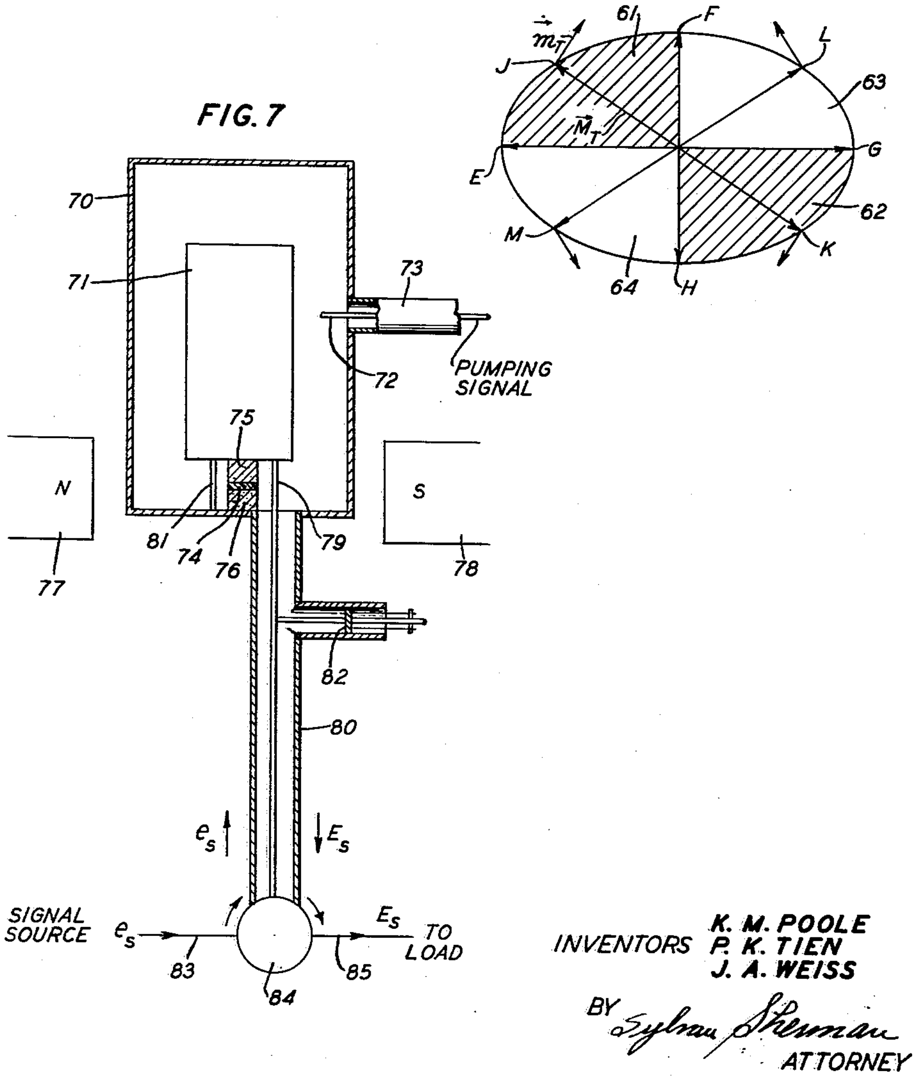

FIG. 3, given by way of illustration, is a diagrammatical showing of the magnetic field patterns in the embodiment of FIG. 1;

FIGS. 4 to 6, given by way of illustration, show the effect of the signal and pumping fields on the precession of the magnetization vector; and FIG. 7 is a view of a second embodiment of the invention.

Referring more particularly to FIG. 1, a perspective view of an illustrative embodiment of the present invention is shown connected and utilized to produce amplification at microwave frequencies. Such an amplifier comprises two intersecting resonators, proportioned to be resonant at different, though related, frequencies, and oriented so that their respective magnetic fields are mutually perpendicular to each other in a common region shared by both of said resonators. In the particular embodiment of the invention illustrated in FIG. 1, the first of said resonators is of the waveguide type, comprising the portion of the reduced rectangular waveguide 10 having a wide dimension of greater than one-half wavelength and less than one wavelength at the signal frequency $f_s$. The input end of guide 10 is connected to guide 14 and hence to a signal source, through the tapered section 13 and iris 11. The other end of guide 10 is terminated in a conductive shorting member 12 whose longitudinal position relative to iris 11 may be adjusted for tuning purposes by means of a plunger 16. The electrical distance between iris 11 and the shorting member 12 is adjusted to be a multiple of one-half wavelength to produce resonance at the signal frequency $f_s$, as will be discussed hereinafter.

Extending above the signal path and forming the upper boundary thereof is the second resonator, comprising the rectangular cavity 17 and the conductive block 18. Cavity 17 and block 18 are proportioned to resonate at the pumping frequency $f_p$. Block 18 is suitably supported within cavity 17 by means of thin dielectric spacers (not shown), and is vertically adjustable by means of the threaded rod 20 which extends from the top surface of block 18.

Energy at the pumping frequency is magnetically coupled into cavity 17 by means of loop 21 which is connected to a source of pumping signal by way of coaxial cable 22.

A signal to be amplified, $e_s$, at a frequency $f_s$ is applied to cavity 10 from waveguide 14. Simultaneously, pumping energy $e_p$ at a frequency $f_p$ is applied to cavity 17 by way of coaxial cable 22. The amplified output $E_s$ is taken from cavity 10 by way of waveguide 14. The amplified signal and the input signal may be separated from each other in any of the usual ways well known in the art; as, for example, a directional coupler or three-port circulator may be used to isolate the input circuit from the output circuit.

Nonlinear coupling between the energy supported in cavity 10 and cavity 17 is provided by an element of gyromagnetic material 23. The term "gyromagnetic material" is employed here in its accepted sense as designating the class of magnetically polarizable materials having unpaired spin systems involving portions of the atoms thereof that are capable of being aligned by an external magnetic polarizing field and which exhibit a significant precessional motion at a frequency within the range contemplated by the invention under the combined influence of said polarizing field and an orthogonally directed varying magnetic field component. This precessional motion is characterized as having an angular momentum and a magnetic moment. Typical of such materials are ionized gases, paramagnetic materials and ferromagnetic materials, the latter including the spinels such as magnesium aluminum ferrite, aluminum zinc ferrite and the rare earth iron oxides having a garnet-like structure of the formula $A_3B_5O_{12}$ where O is oxygen, A is at least one element selected from the group consisting of yttrium and the rare earths having an atomic number between 62 and 71, inclusive, and B is iron optionally containing at least one element selected from the group consisting of gallium, aluminum, scandium, indium and chromium.

Element 23 may be made of any low-loss gyromagnetic material chosen from the above-mentioned groups. Preferably, however, it is a single crystal material having a narrow resonance line in order to conserve power. For this use single crystals of manganese ferrite or yttrium-iron garnet have been found satisfactory.

Figure 2:
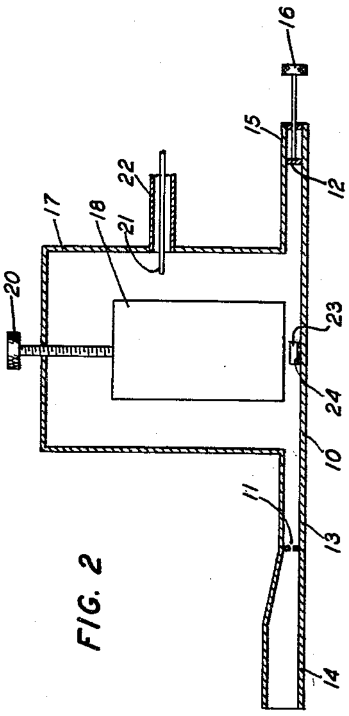
FIG. 2 is an end view of the embodiment of FIG. 1 showing in greater detail the location of the gyromagnetic element.

The nonlinear element is located between the bottom of block 18 and the wide wall of guide 10 in the common region of the amplifier shared by both resonators. It is supported by dielectric spacer 24 in a manner as shown in FIG. 2. The dielectric support, in addition to holding the gyromagnetic element in position, maintains a minimum spacing between the element and the conductive wall of guide 10. A second dielectric spacer may be placed between the gyromagnetic material and block 18 to maintain a given minimum spacing therebetween where this is deemed desirable.

Element 23 is biased by a steady polarizing magnetic field of a strength and direction to be described in greater detail hereinafter. As illustrated in FIG. 1, the field is applied along the axis of waveguide 10 and is supplied by the two solenoids 28 and 29 wound in a series-aiding relationship. The two windings are energized from a source of constant potential 30 through a potentiometer 31. The biasing field, however, may be supplied by any other suitable means or element 23 may be permanently magnetized if desired.

The significance of the direction of the steady biasing field and other factors mentioned hereinbefore may be more easily understood in connection with an examination of the magnetic field patterns of wave energy supported by the two resonant circuits 10 and 17. Referring, therefore, to FIG. 3, the outline of the boundaries of the amplifier are shown along with the oscillatory magnetic fields associated with the standing wave patterns supported in the respective cavities.

The magnetic field loops of the signal frequency $f_s$ are illustrated by the closed loops 31 and 32 comprising the standing wave pattern set up in cavity 10. Ideally, these loops lie in planes which are parallel to the wide dimension of cavity 10. In accordance with the invention, cavity 10 is a multiple of half wavelengths of frequency $f_s$, and more specifically extends an even number of quarter wavelengths on either side of the region including the gyromagnetic element 23 so that the magnetic field in this region is maximum and exists substantially in a transverse direction with respect to cavity 10.

The magnetic field loops of the pump frequency $f_p$ are illustrated by the closed loops 33 encircling the conductive block 18 and lie in planes perpendicular to the wide dimension of cavity 10. In accordance with the invention, cavity 17 is tuned to the pump frequency where the tuning is a function of the dimensions of the cavity 17 and the dimensions of the conductive block 18 and, in particular, of the space between the two.

It will be noted that in the region occupied in common by the two cavities the magnetic fields of the pump and signal intersect at right angles to each other. Consequently, there is no direct coupling or tendency for any energy transfer therebetween. It will also be noted that by virtue of the presence of block 18 and the reduced height of guide 10, the magnetic fields are highly concentrated at their points of intersection in the common region of the amplifier.

The exclusive coupling between the fields is provided, as in the prior art amplifiers, by an element of gyromagnetic material 23. The crux of this invention, however, is in the means whereby this coupling is effected, and in particular to the direction of the steady biasing field with respect to the radio frequency magnetic fields. As shown in FIG. 3, the steady biasing field $H_0$ is directed parallel to the pump field and perpendicular to the signal field.

This particular orientation of magnetic fields has a number of advantages. Since the pumping field is parallel to the biasing field, the gyromagnetic material cannot be made to resonate at the pump frequency. Consequently, the pumping power requirements for such an amplifier are substantially reduced. In fact, theoretically, there can be no absorption of energy at the pumping frequency by the gyromagnetic material unless the magnetization is made to precess with a component at half the pump frequency. This fact is of the utmost importance in CW operation where heating of the gyromagnetic sample may be a limiting factor. It should also be noted that in the absence of any signal no power is dissipated in the gyromagnetic element. That such an arrangement of fields is capable of providing amplification can be readily shown by considering FIGS. 4, 5 and 6.

In operation as a microwave amplifier, the frequency $f_p$ of the pumping source in the embodiment of the invention shown in FIG. 1 is adjusted to be twice the signal frequency $f_s$, and to have a magnitude below the threshold of self-oscillation. The strength of the biasing magnetic field is adjusted to produce gyromagnetic resonance in element 23 at the frequency of the signal. In FIG. 4 there is shown the motion of a magnetization vector $$\vec{M}$$

of constant magnitude precessing under the influence of a constant biasing field $$\vec{H}_0$$

and the orthogonally directed signal field $$\vec{h}_s$$

In a uniform medium biased to gyromagnetic resonance, the path described by the precessing magnetization vector is a circle. However, by suitably shaping and orienting the gyromagnetic specimen, the path thus described can be made to be elliptical (as shown in FIGS.

4–6) due to the presence in the material of unequal demagnetizing forces. FIG. 5 shows the position of the transverse component $$\vec{M}_T$$

of the magnetization vector $$\vec{M}$$

at various parts of the cycle, and the corresponding direction of that component of the time rate of change of $$\vec{M}_T$$

due solely to its interaction with the steady biasing field $$\vec{H}_0.$$

$$\dot{\vec{M}}_T,$$

the vector representing this component of the time rate of change, is given as $$\dot{\vec{M}}_T=\vec{M}_T\times\vec{H}_0$$

and is perpendicular to $$\vec{M}_T.$$

It will be noticed that at the principal axes of the ellipse described by the magnetization vector, the component $$\dot{\vec{M}}_T$$

is tangent to the path. There is, consequently, no net force operating at these points which tend to increase or decrease the precession angle. At the intermediate points A, B, C and D, however, $$\dot{\vec{M}}_T$$

being perpendicular to $$\vec{M}_T$$

is not tangent to the path due to its elliptical shape. At these points $$\dot{\vec{M}}_T$$

may be resolved into two components, one tangent to the path and the other normal thereto. At points A and C, the normal component is directed outward, tending to increase $$\vec{M}_T$$

and hence tending to increase the precession angle. However, at points B and D the normal component is directed inward, tending to decrease $$\vec{M}_T$$

and hence to decrease the precession angle. Since the magnitudes of these effects are equal, they tend to cancel. The net effect, therefore, is to maintain a constant average precession angle.

If, now, a parallel pumping field at twice the precession (signal) frequency is superimposed upon the biasing field, it too interacts with the transverse component of the magnetization vector in accordance with the relation $$\dot{\vec{m}}_T=\vec{M}_T\times\vec{h}_p$$

where $$\dot{\vec{m}}_T$$

is the component of the time rate of change of $$\vec{M}_T$$

due solely to its interaction with the pumping field and where $$\vec{h}_p$$

is the amplitude of the pumping field. For optimum performance, the phase of the pumping field is adjusted so that the amplitude of this field is zero when $$\vec{M}_T$$

is aligned with the principal axes of the ellipse. As shown in FIG. 6, this corresponds to points E, F, G and H. Since $$\vec{h}_p$$

is zero at these points, $$\dot{\vec{m}}_T$$

is also zero. In the shaded regions 61 and 62, $$\vec{h}_p$$

is directed in the same direction as the biasing field $$\vec{H}_0$$

whereas in the unshaded regions 63 and 64, $$\vec{h}_p$$

is directed oppositely to $$\vec{H}_0.$$

At points J and K in the shaded regions 61 and 62, $$\dot{\vec{m}}_T$$

is seen to have an outward component as was the case at points A and C in FIG. 5. It will also be seen that at points L and M in the unshaded regions 63 and 64, $$\dot{\vec{m}}_T$$

also has an outward component due to the reversal in direction of $$\vec{h}_p$$

in these intervals. This, it will be noted, is contrary to the situation at points B and D in FIG. 5. The result, therefore, of the presence of the parallel pumping field is to produce an outward component of $$\dot{\vec{m}}_T$$

at points all around the precessional path of the magnetization vector. The net effect of these outward components is to increase the precessional angle until a new equilibrium condition is established consistent with the losses in the system. If the power flowing from the pumping source to the gyromagnetic elements is sufficiently large, the system will oscillate. At lower values of the transferred power, the system will amplify.

It should be noted that if the precession path is circular, the components of $$\vec{M}_T \text{ and } \dot{\vec{m}}_T$$

will all be tangent to the precession path and there will be no tendency to increase or decrease the precession angle. Consequently, there can be no amplification in such a system. Hence, for the style of operation described above the geometry of the gyromagnetic element should be such as to produce elliptical precession of the magnetization vector. In particular, the specimen should not have axial symmetry about an axis parallel to the steady biasing field. In the embodiment of FIG. 1, element 23 is shown as a thin disk, magnetized in a direction parallel to its broad surfaces.

A quantitative analysis of the parallel pump amplifier starts from the equation of motion of the magnetization, which may be written as $$\frac{d\vec{M}}{dt}=-\gamma(\vec{M}\times\vec{H})+\frac{\alpha}{M}\left(\vec{M}\times\frac{d\vec{M}}{dt}\right) \qquad (1)$$

where $\vec{M}$ is the sample magnetization,
$\vec{H}$ is the total internal field,
$\gamma$ is the magnitude of the gyromagnetic ratio, and
$\alpha$ is the loss parameter.

The magnetization and field components may, in turn, be expressed with reference to the $x$—$y$—$z$ coordinate system shown in FIG. 3 as $$M_x=A\cos\omega_s t$$
$$M_y=\frac{A}{\rho}\sin\omega_s t$$
$$M_z=M$$
$$H_x=h_x\sin\omega_s t-4\pi N_x M_x$$
$$H_y=-\sigma h_x\cos\omega_s t-4\pi N_y M_y$$
$$H_z=H_0-4\pi N_z M+h_p\sin 2\omega_s t$$

where $\omega_s$ is the signal frequency, equal to the Kittel, or main resonance frequency $\omega_r$, where $$\omega_r=\gamma\sqrt{[H_0+4\pi M(N_x-N_z)][H_0+4\pi M(N_y-N_z)]}$$
$$\rho^2=\frac{H_0+4\pi M(N_y-N_z)}{H_0+4\pi M(N_x-N_z)}$$

$\sigma$ is the polarization of the signal field given as the ratio of the amplitudes of the $y$ and $x$ transverse components of the signal field, and $h_x$ is its $x$ component;
$h_p$ is the magnitude of the $z$ directed pumping field at frequency $2\omega_s$;
$N_x$, $N_y$ and $N_z$ are the normalized demagnetizing factors $(N_x+N_y+N_z=1)$;
M is the saturation magnetization of the gyromagnetic material, and
A the magnitude of the $x$ component of the signal frequency magnetization.

The solution of Equation 1 leads to the expression $$A\left[\frac{h_p}{2}\left(\rho-\frac{1}{\rho}\right)-\Delta H\right]=Mh_x(\sigma+\rho) \qquad (2)$$

where ΔH is the resonance line width, defined on a variable frequency, fixed field basis and is given as $$\Delta H=\frac{\omega_s\alpha}{\gamma}\left(\rho+\frac{1}{\rho}\right)$$

The power supplied to the signal frequency circuit by the sample under the influence of the pumping field $h_p$ is $$P_{s\to o}=-\left(\frac{dM_x}{dt}H_x+\frac{dM_y}{dt}H_y\right)_{\text{Average}}V_s$$

where $V_s$ is the sample volume. Substituting for M and H and differentiating gives $$P_{s\to o}=\frac{A\omega_s h_x V_s}{2}(\sigma+\rho) \qquad (3)$$

Substituting from Equation 2

$$P_{s\to o}=\frac{M\omega_s h_x^2 V_s}{\left[h_p\left(\rho-\frac{1}{\rho}\right)-\Delta H\right]}\,\frac{(\sigma+\rho)^2}{\rho} \qquad (4)$$

At the oscillation threshold, this power must be equal to the power absorbed in the signal circuit and its load $$P=\frac{\omega_s}{8\pi Q_s}\int_{c_s}h^2dv \qquad (5)$$

where $h$ is the total field in the signal cavity, and $Q_s$ the loaded Q of the signal circuit. The integral is taken over the signal cavity volume.

Equating 4 and 5 give $$\frac{h_p}{2}\left(\rho-\frac{1}{\rho}\right)-\Delta H=4\pi MF_sQ_s\left(\frac{(\sigma+\rho)^2}{\rho}\right) \qquad (6)$$

where $F_s$ is defined as the signal filling factor and is equal to $$F_s=\frac{h_x^2V_s}{\int_{c_s}h^2dv}$$

In a practical design, the right-hand side of Equation 6 will be, in general, smaller than, or comparable to ΔH. Assuming it to be equal to ΔH, Equation 6 reduces to $$h_p=\frac{4\Delta H}{\rho-\frac{1}{\rho}} \qquad (7)$$

From the definition of $\rho$ and $\omega_r$ $$\rho-\frac{1}{\rho}=\frac{4\pi M\gamma}{\omega_r}(N_y-N_x)$$

Choosing a geometry for the gyromagnetic sample such as a thin disk, for which $(N_y-N_x)\sim 1$, Equation 7 gives $$h_p\sim 4\Delta H\frac{\omega_s}{4\pi M\gamma} \qquad (8)$$

The pump power required to maintain this field in the pump cavity with a Q of $Q_p$ is $$P_{pp}=\frac{\omega_p}{8\pi Q_p}\int_{c_p}h^2dv \qquad (9)$$

where $h$ is the total field at any point in the cavity for which the $z$ directed field at the sample is $h_p$. The integral is taken over the pump cavity volume. Expressing the pump-filling factor as $$F_p=\frac{h_p^2V_s}{\int_{c_p}h^2dv} \qquad (10)$$

and substituting Equations 8 and 10 in Equation 9, gives $$P_{pp}=\frac{2}{\pi\omega_M^2F_p}\,\frac{\Delta H^2V_s}{Q_p}\omega_p\omega_s^2 \qquad (11)$$

Equation 11 gives the threshold power for the parallel pump style of operation, which may now be compared with the electromagnetic and modified semistatic cases. In this comparison $\sigma$ is assumed equal to zero, and $\rho$ equal to unity.

For the electromagnetic style $$P_{em}=\frac{4\pi M}{2\pi F_sF_i\omega_m^2}\,\frac{\Delta HV_s}{Q_sQ_i}\omega_p\omega_s^2$$

where $F_i$ and $Q_i$ are the filling factor and Q, respectively, of the idler circuit.

For the modified semistatic style of operation $$P_{ss}=\frac{4\pi M}{2\pi F_sF_p\omega_m^2}\,\frac{\Delta HV_s}{Q_sQ_p}\omega_p\omega_s^2$$

Clearly, $P_{em}=P_{ss}$ if $(F_iQ_i)_{em}$ equals $(F_pQ_p)ss$, and $$\frac{P_{pp}}{P_{ss}}=\frac{4\Delta HF_sQ_s}{4\pi M} \qquad (12)$$

For the better available materials, $\Delta H\sim 1$ oersted and $4\pi M\sim 2000$ oersted. With a loaded circuit $Q_s$ of 1000, and a filling factor $F_s$ of 0.1, the threshold power for the parallel pumping style of operation is seen to be, from Equation 12, approximately an order of magnitude less than for the other two modes of operation, that is, $$P_{pp}\sim 0.2P_{ss}$$

From the above analysis it will be noted that the parallel pumping arrangement, in accordance with the invention, is capable of operating at much reduced power levels as compared to the electromagnetic and modified semistatic styles of operation Furthermore, since the pumping field and biasing field are parallel, substantially none of the pumping power is dissipated in the gyromagnetic material. The parallel pumping amplifier may consequently be operated CW since there are substantially no losses in the material in the absence of the signal.

From Equation 6 it is also seen that a low signal-filling factor $F_s$ and a low signal cavity $Q_s$ are desirable in order to keep the pumping field, $h_p$, low.

In a second embodiment of the invention shown in FIG. 7, the pumping circuit comprises the conductive cavity 70 and conductive block 71. Pumping energy is coupled to cavity 70 by means of the loop 72 at the end of the coaxial line 73.

Situated below block 71 is the thin disk 74 of gyromagnetic material sandwiched between, and supported by, the dielectric members 75 and 76. Members 75 and 76, in addition to supporting the gyromagnetic element, act as spacers between the latter and the conductive wall surfaces of cavity 70 and block 71.

The gyromagnetic member 72 is magnetically biased in a direction parallel to the pumping field in accordance with the invention by any suitable means. As shown in FIG. 7, a permanent magnet, whose pole ends 77 and 78 are shown, is used.

Signal energy is applied to the gyromagnetic material 74 by means of the coupling loop comprising the extension 79 of the center conductor of coaxial cable 80, which extends up to, and terminates on, block 71; the bottom surface of block 71 itself; the conductive filament 81; and the bottom surface of cavity 70 between the filament 81 and the outer sheath of cable 80. In addition to forming part of the signal coupling loop, conductive elements 79 and 81 support block 71 within cavity 70.

Situated along the coaxial cable 80 is the coaxial tuning stub 82 for tuning the signal circuit.

In operation, a signal $e_s$ applied to branch 83 of the three-port circulator 84, is directed by the circulator to coaxial cable 80 and hence to the amplifier. The amplified signal, $E_s$, in turn, leaves the amplifier along the same cable 80, enters the three-port circulator 84 and is directed by the latter to the load situated in branch 85. In this manner, the input and output signal circuits are separated from each other.

While the above discussion was directed to embodiments of the amplifier in which the signal frequency and the idler frequency are equal (the degenerative form), the parallel pumping style of operation, as taught by the invention, can be practiced equally as well using unequal idler and signal frequencies subject to the usual limitation that their sum be equal to the pumping frequency, or such other frequency limitations common to the parametric amplifier art.

In addition, the above discussion was directed to embodiments of the invention wherein the gyromagnetic material is biased in such a manner as to induce within the material a resonant state of uniform precession, generally referred to as "gyromagnetic" or "Kittel" resonance. However, as is well known in the art, other nonuniform resonant modes are capable of being induced in an element of gyromagnetic material. Such nonuniform modes are referred to in numerous ways such as, for example, "higher order modes," "magnetostatic modes" or "Walker modes." (See "Magnetostatic Modes in Ferromagnetic Resonance" by L. R. Walker. The Physical Review, volume 105, pages 390–399, January 15, 1957; also, "Resonant Modes of Ferromagnetic Spheroids" by L. R. Walker, Journal of Applied Physics, volume 29, pages 318–323, March 1958.)

These resonant modes are characterized in that the direction of the magnetization vectors is different throughout the volume of the gyromagnetic sample and their existence, in general, does not necessarily depend upon any nonsymmetry in the geometry of material or nonuniformity in the biasing field. Nonuniform resonant modes are inherently capable of existing within most gyromagnetic materials and are induced by selecting the appropriate amplitude of biasing field. For the degenerate mode of operation, this is a relatively simple matter since only one frequency and hence only one mode must be induced. However, for the nondegenerate type parametric amplifier, it is necessary to select a material and a biasing field which will induce resonance at two discrete frequencies which are so related that their sum is equal to the pumping frequency. Each of the Walker modes thus induced has its own particular precessional pattern.

Referring again to the structure of FIG. 7, nondegenerate operation can be established in the amplifier there shown by suitably selecting the biasing field produced by pole pieces 77 and 78. Under properly chosen operating conditions, a pair of Walker modes is preferentially excited in element 74. The two modes thus induced function as signal and idler resonances in the usual sense. Since the resonant fields are substantially entirely contained with the body of the gyromagnetic element itself, no additional external circuit components are required. As before, the signal is coupled into and out of the amplifier by means of the coupling loop comprising the extension 79 of the center conductor of coaxial cable 80, block 71, element 81 and cavity 70.

The magnetostatic mode of operation herein described in which the pumping power is directly coupled to the magnetostatic modes is to be distinguished from the prior art magnetostatic mode of operation wherein the pumping power is first coupled to the uniform precessional mode which in turn couples to one or more magnetostatic modes. By coupling directly to the desired resonant modes, magnetostatic operation, in accordance with the invention, avoids the possibility of coupling to other spurious modes and thus affords a more efficient style of operation.

While it was indicated above that the magnetostatic mode of operation may be obtained using a uniform biasing field and a symmetrically shaped sample, the biasing field or the sample may be modified in any manner consistent with the particular mode to be induced so as to facilitate its establishment within the sample. This is generally not essential but may be resorted to where, for some reason, the desired mode is not otherwise readily induced.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A high frequency signal amplifier comprising an electromagnetic resonator proportioned to support an oscillatory electromagnetic wave at a pumping frequency $f_p$, means for establishing within said resonator said oscillatory wave with magnetic field components extending in a given direction within a region of said resonator, an element of gyromagnetic material having a noncircular surface area in a plane perpendicular to said given direction disposed within said region, means for establishing within said region a magnetic biasing field in a direction solely parallel to said components, said biasing field having an intensity to produce gyromagnetic resonance in said element at half said pumping frequency, and means for introducing into said region a signal at half said pumping frequency having magnetic field components perpendicular to said given direction and for extracting from said region an amplified signal at half said pumping frequency.

2. The combination according to claim 1 wherein said element is a thin circular disk magnetically biased in a direction parallel to the circular surface of said disk.

3. A high frequency signal amplifier comprising a plurality of intersecting electromagnetic field supporting structures, a gyromagnetic element disposed within the intersection of said structures, means for establishing a high frequency magnetic field pattern at said intersection in a given direction, means for magnetically biasing said element solely in a direction parallel to said given direction, means for introducing into one of said structures a signal at a frequency lower than said high frequency having magnetic field components perpendicular to said given direction, and means for withdrawing amplified signal energy from said amplifier.

4. A high frequency signal amplifier comprising first and second conductively bounded waveguide cavities supportive of two distinct oscillatory magnetic field patterns having a region of orthogonally intersecting magnetic field components, the first of said cavities being tuned to resonate at a signal frequency $f_s$, the second of said cavities being tuned to resonate at a pumping frequency $2f_s$, means for coupling between said orthogonally intersecting magnetic field components comprising an element of gyromagnetic material disposed within said region whose surface area in a plane perpendicular to said pumping field components is noncircular, and means for establishing a steady magnetic biasing field within said region in a direction solely parallel to said pumping frequency magnetic field having an intensity to produce gyromagnetic resonance in said element at said signal frequency.

5. The combination according to claim 4 wherein said element is a thin circular disk magnetically biased in a direction parallel to the circular surface of said disk.

6. A high frequency signal amplifier comprising a plurality of electromagnetic field supporting structures supportive of mutually orthogonal magnetic field components at a pumping frequency $f_p$ and at a signal frequency $f_s$ lower than said pumping frequency, an element of gyromagnetic material electromagnetically coupled to said mutually orthogonal field components in said structures, means for magnetically biasing said element solely in a direction parallel to the magnetic field components of said pumping frequency, means for introducing into one of said structures a signal at said signal frequency, and means for withdrawing amplified wave energy from said amplifier.

References Cited in the file of this patent

Weiss: "Physical Review," July 1, 1957, page 317.
Denton: "Proceedings of the IRE," 1960, pages 937–938.